United States Patent [19]

Nixon

[11] 4,291,260
[45] Sep. 22, 1981

[54] MOTOR VELOCITY CONTROL SERVO AMPLIFIER

[76] Inventor: John M. Nixon, 902 NW. 4th Ave., Mineral Wells, Tex. 76067

[21] Appl. No.: 115,753

[22] Filed: Jan. 28, 1980

Related U.S. Application Data

[63] Continuation of Ser. No. 897,200, Apr. 17, 1978.

[51] Int. Cl.$^3$ .......................................... H02P 5/16
[52] U.S. Cl. .................................................. 318/331
[58] Field of Search ............................... 318/331, 635

[56] References Cited

U.S. PATENT DOCUMENTS

| | | | |
|---|---|---|---|
| 3,504,260 | 3/1970 | Staples | 318/331 |
| 3,588,654 | 6/1971 | Balazs | 318/331 |
| 3,708,737 | 1/1973 | Johnson | 318/331 |
| 3,803,470 | 4/1974 | Vosteen | 318/331 |
| 3,952,237 | 4/1976 | Kimizuka | 318/313 |
| 3,976,926 | 8/1976 | Egbert | 318/331 |

OTHER PUBLICATIONS

Paris, F. "Motor Spee Control" *Electrical Engineering Times*, Jan. 10, 1977, pp. 15–16.

*Primary Examiner*—David Smith, Jr.
*Attorney, Agent, or Firm*—Richards, Harris & Medlock

[57] ABSTRACT

Motor velocity is controlled in accordance with the difference between a motor velocity command signal and an actual motor velocity signal related to the magnitude of motor back emf. Connected to the windings of a motor, usually the armature winding, is a velocity detector that samples and stores the back emf as the actual motor velocity signal. This actual motor velocity signal is compared with the motor velocity command signal in a differential command amplifier that generates a motor drive signal to an output stage. The output stage responds to the motor drive signal to connect a voltage to windings of the motor during a motor drive time. The sample time interval of the motor velocity detector and the motor drive time of the output stage are established by the output of an asymmetrical square wave generator providing a sample time interval signal and a motor drive time signal.

5 Claims, 3 Drawing Figures

MOTOR VELOCITY CONTROL SERVO AMPLIFIER

This is a continuation of application Ser. No. 897,200, filed Apr. 17, 1978.

This invention relates to a servo amplifier, and more particularly to a servo amplifier for controlling the velocity of a motor by measuring actual motor velocity at a motor winding.

Velocity control of motors in servo loops has heretofore utilized a motor/tachometer assembly with motor velocity measured at the output of the tachometer. The output of the tachometer was applied to a control loop that compared actual motor velocity with a commanded motor velocity signal. While the motor/tachometer assembly performed reasonably well in service, it is expensive and uses somewhat complicated techniques for controlling motor velocity.

Another heretofore used technique for controlling motor velocity is known as a resistive velocity bridge. A commanded motor velocity is maintained by utilizing the variation in the effective armature resistance, which resistance varies with motor velocity. The variable resistance as measured at the motor armature is connected as one member of a resistance bridge with the output voltage from the bridge then varying with motor velocity.

Although armature resistance of a motor does vary with velocity, this variation is not always linear or predictable. As a result, the resistance velocity bridge approach to motor velocity control has not been generally accepted. The unpredictability of armature resistance, that is, the armature resistance is not consistent from segment to segment because of the number of turns of each winding are not precisely controlled, causes significant velocity errors. Further, when a commutator type motor is to be velocity controlled, the commutator contact resistance varies to induce an additional error factor in the bridge measurement. The resistive velocity bridge approach has found acceptance, however, when very small and expensive instrument motors are utilized in the control scheme.

Another presently available technique for motor velocity control is a variation in the motor/tachometer assembly. A motor winding and a generator winding are provided on a common shaft within one housing in a motor/generator combination. The generator provides the motor velocity signal whenever the unit is operating as a motor, and this velocity signal is compared with a commanded motor velocity in a servo loop.

Although there are numerous applications where the velocity of a motor is controlled in accordance with a command input, it is particularly useful to control the servo actuators in accordance with a command signal from an autopilot or aircraft control system. Output signals from the computing circuitry of the autopilot constitute the motor velocity command signal for establishing a desired motor velocity. It should be noted that the motor to be controlled is not limited to a D.C. servo motor as ordinarily used in aircraft control, but any motor that generates a back emf may be controlled by the amplifier of the present invention.

In accordance with the present invention, a motor to be velocity controlled is deenergized during a sample time interval and during this interval the generated back emf is measured as an indication of motor velocity. This measurement relating to motor velocity is stored and compared with a commanded motor velocity signal to control the application of an energizing voltage to the motor windings during a motor drive time. Any motor that generates a back emf during the deenergizing interval may be utilized with the amplifier of the present invention.

During the motor drive time, motor velocity is proportional to the applied energizing voltage for constant loads. As the load of the motor changes the motor velocity will be controlled as a function of applied energizing voltage by sensing the back emf and comparing the back emf signal with a commanded motor velocity signal. By controlling the motor with the back emf, it is thus possible to have a reasonably constant motor velocity for changing loads by varying the level of applied energizing voltage. An advantage of the present invention is thus to provide velocity regulation of a motor that is reasonably constant for a commanded input signal, even though the motor may inherently have poor speed regulation. The amount of power a motor is required to deliver has little effect on motor velocity.

To control motor velocity with the amplifier of the present invention the behavior of a rotating armature in a field to generate a back emf is utilized. If the armature isn't moving through the field, then there is no back emf and the level of any generated back emf is an immediate indication of the operation of the motor. The amplifier of the present invention does not rely on a signal provided by an independent generator, but rather utilizes the basic operation of the motor. There is also no reliance on the variation in armature resistance, which as explained, may vary with armature construction.

To control motor velocity with the amplifier to be described, the motor is operated on a duty cycle divided between a motor drive time and a sample time interval. Typically, the motor drive time may be 90% of the duty cycle with the energizing voltage disconnected from the motor for the remaining 10% of the duty cycle, that is, during the sample time interval. When the motor is open circuited during the sample time interval, the back emf is generated for application to circuitry for comparison with a command motor velocity signal. The excitation of the motor during the motor drive time is varied in accordance with the comparison to command the back emf to either increase or decrease to produce a minimum difference from the command motor velocity signal. Again, this comparison is not made with an externally generated signal, that is, a signal generated external of the motor, but rather with a signal that is directly related to actual motor operation. Since the back emf of a motor directly reflects motor operation a more reliable commanded motor velocity is obtainable.

Heretofore, apparatus for controlling motor velocity was designed to include schemes to overcome the inherent operational threshold of the motor. This is a classic problem in servo amplifier designs in that the motor must have applied thereto a threshold voltage which must be exceeded before the motor begins to operate. One of the several schemes used to overcome the "dead zone" or threshold problem is to use adjustable dead band circuitry to provide the threshold voltage to the motor. By measuring the back emf as an indication of motor operation the problem of the inherent threshold of a motor is minimized. If the excitation voltage applied to the motor during the motor drive time by the amplifier of the present invention is not great enough to cause the motor to operate, then there will be no measured back emf during the sample time interval. Without a back emf measurement the comparison with the command motor velocity signal will cause an increased excitation voltage to be applied to the motor until the threshold is overcome. The back emf is now generated and compared with the command motor velocity signal and the excitation voltage is adjusted until the desired motor velocity is obtained. There is no need for sophisticated dead zone circuitry as heretofore required.

In accordance with the present invention, there is provided a motor velocity sampling servo amplifier including means connected to a motor and responding to motor velocity during a sample time interval for generating a motor velocity signal. This motor velocity signal is applied to the input of an amplifier that also receives a command motor velocity signal and generates a motor drive signal to an output stage. The output stage is activated during a motor drive time to connect a supply voltage to the motor in accordance with the generated motor drive signal.

Further in accordance with the present invention, there is provided a motor velocity sampling servo amplifier having a motor velocity detector for sampling the back emf of a motor and storing the sample value during a motor drive time. During the motor drive time a command amplifier that also receives a command motor velocity signal responds to the difference between the two inputs thereto and generates a motor drive signal to an output stage that operates in accordance with the motor drive signal to connect an energizing voltage to the motor. Signals for establishing the sample time interval of the motor velocity detector and the motor drive time of the output stage are generated by a time generator.

A more complete understanding of the invention and its advantages will be apparent from the following specification and claims and from the accompanying drawings illustrative of the invention.

Referring to the drawings.

Figure 1:
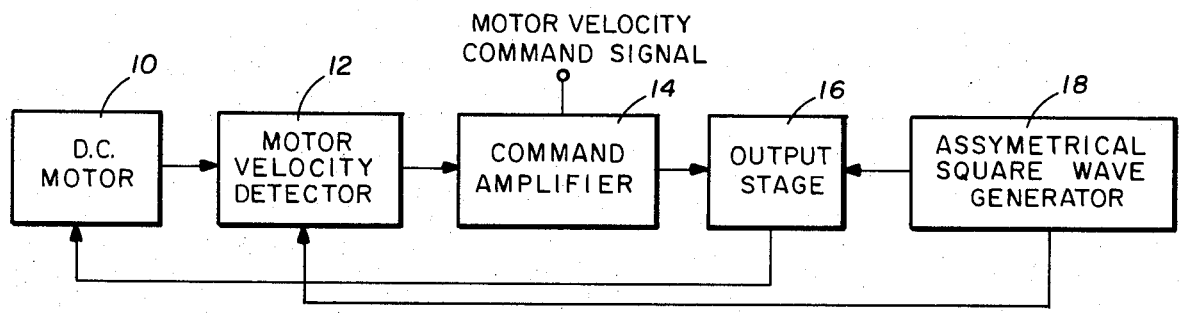
FIG. 1 is a block diagram of a motor velocity sampling servo amplifier for commanding the velocity of a D.C. motor.

Referring to FIG. 1, there is shown a sampling servo amplifier for controlling the velocity of a D.C. motor 10 for example, a permanent magnet having an armature with conventional windings, for driving a load such as actuators for control surfaces of an aircraft. Connected to a winding of the D.C. motor 10 is a motor velocity detector 12 that samples the back emf generated by the motor during a sample time interval. During the sample interval any energizing voltage applied to the motor 10 is disconnected.

The sampled back emf input to the motor velocity detector 12 is stored and applied to an input of a command amplifier 14 during a motor drive time of a duty cycle. Also connected to the command amplifier 14 is a motor velocity command signal which, as an example, may be the final output of an autopilot for aircraft control. The command amplifier 14 compares the motor velocity command signal with the stored back emf motor velocity signal to generate an output motor drive signal proportional to the difference between the two inputs. This difference signal or error signal is a motor drive applied to an input of the output stage 16 that controls the application of an energizing voltage to the D.C. motor 10 during the motor drive time. The level of the energizing voltage applied to the D.C. motor 10 is sufficient to drive the motor at a velocity to generate a back emf motor velocity signal that will be stored in the detector 12 to generate an error signal at the output of the amplifier 14 and applied to the output stage 16. When the back emf of the D.C. motor 10 as mixed with the motor velocity command signal applied to the amplifier 14 are balanced then the commanded motor velocity has been reached and the output stage 16 maintains the energizing voltage at this level connected to the motor. Any change in load connected to the D.C. motor 10 that causes the motor velocity to vary from the commanded velocity will cause a change in the level of the generated back emf to produce a difference between the back emf motor velocity signal and the motor velocity command signal as applied to the amplifier 14. An error signal result which activates the output stage 16 to apply a different level of energizing voltage to the motor 10 to regain the desired commanded motor velocity.

To measure the back emf during the sample time interval of the duty cycle, the energizing voltage applied to the motor must be disconnected. This disconnection is achieved through the output stage 16 in accordance with a motor drive time signal generated at the output of an asymmetrical square wave generator 18. Also output from the asymmetrical square wave generator 18 is a sample time interval signal applied to the motor velocity detector 12. It is this signal that operates the detector 12 to sample and hold the back emf motor drive velocity signal.

Typically, a duty cycle established by the motor drive time signal and the sample time interval signal may be 90% motor drive and 10% sample interval, although other duty cycles are considered possible. The sample time interval, however, must be long enough to minimize transient effects of the motor due to turning off the output stage. Thus, the sample is taken after these transient effects diminish so that the final value stored as the motor velocity signal represent the actual motor velocity rather than some voltage due to the inductance of the motor. Thus, the sample time interval may vary with the value of inductance and the effect of inductance on the back emf signal. The asymmetrical square wave generator is configured to provide the desired duty cycle to achieve a commanded motor velocity during the motor drive time interval.

In operation of the circuit of FIG. 1, assume that the D.C. motor 10 is at rest and a motor velocity command signal is applied to the amplifier 14. This produces a motor drive error signal to the output stage 16 which is immediately applied as a large energizing voltage to the motor 10. The D.C. motor 10 is energized and begins to operate as evidenced by rotation of the armature. During this time the asymmetrical square wave generator 18 is provided the motor drive time signal and the sample time interval signal will not be applied to the motor velocity detector 12. At the first sample time interval the asymmetrical square wave generator 18 generates the sample time interval signal thereby turning off the output stage 16 which disconnects the energizing voltage from the D.C. motor 10. The sampling interval time signal is applied to the detector 12 which now connects a sample and hold circuit to a winding of the D.C. motor 10. With the sample time interval of sufficient duration to minimize the effects of tansient in the back emf from the motor 10, a signal is sampled and held in the detector 12 which is related to actual motor velocity. This back emf motor velocity signal is mixed with the motor velocity command signal at the amplifier 14 to change the motor drive error signal applied to the output stage 16.

At the end of the sample time interval the square wave generator 18 again generates the motor drive time signal and turns off the detector 12. The output stage 16 again connects an energizing voltage to the D.C. motor 10 at the level of the motor drive signal applied to the input thereto.

This sampling, holding and comparing continues until the difference between the stored sample of the back emf motor velocity signal and the motor velocity command signal are balanced to produce an error output applied to the output stage 16. At that time, the velocity of the D.C. motor 10 is at the commanded level as determined by the motor velocity command signal; the system operates in this steady condition until the back emf motor velocity drive signal as stored in the detector 12, or the motor velocity command signal to the amplifier 14, are changed.

It should be noted that the actual motor velocity is measured to control the application of an energizing voltage to the D.C. motor 10. There is no reliance upon an external generator such as in the motor/tachometer assembly and the effects of non-uniformity in armature resistance due to manufacturing tolerances do not effect the system performance. It is only actual motor velocity that is used to drive the motor at the commanded velocity.

Figure 2:
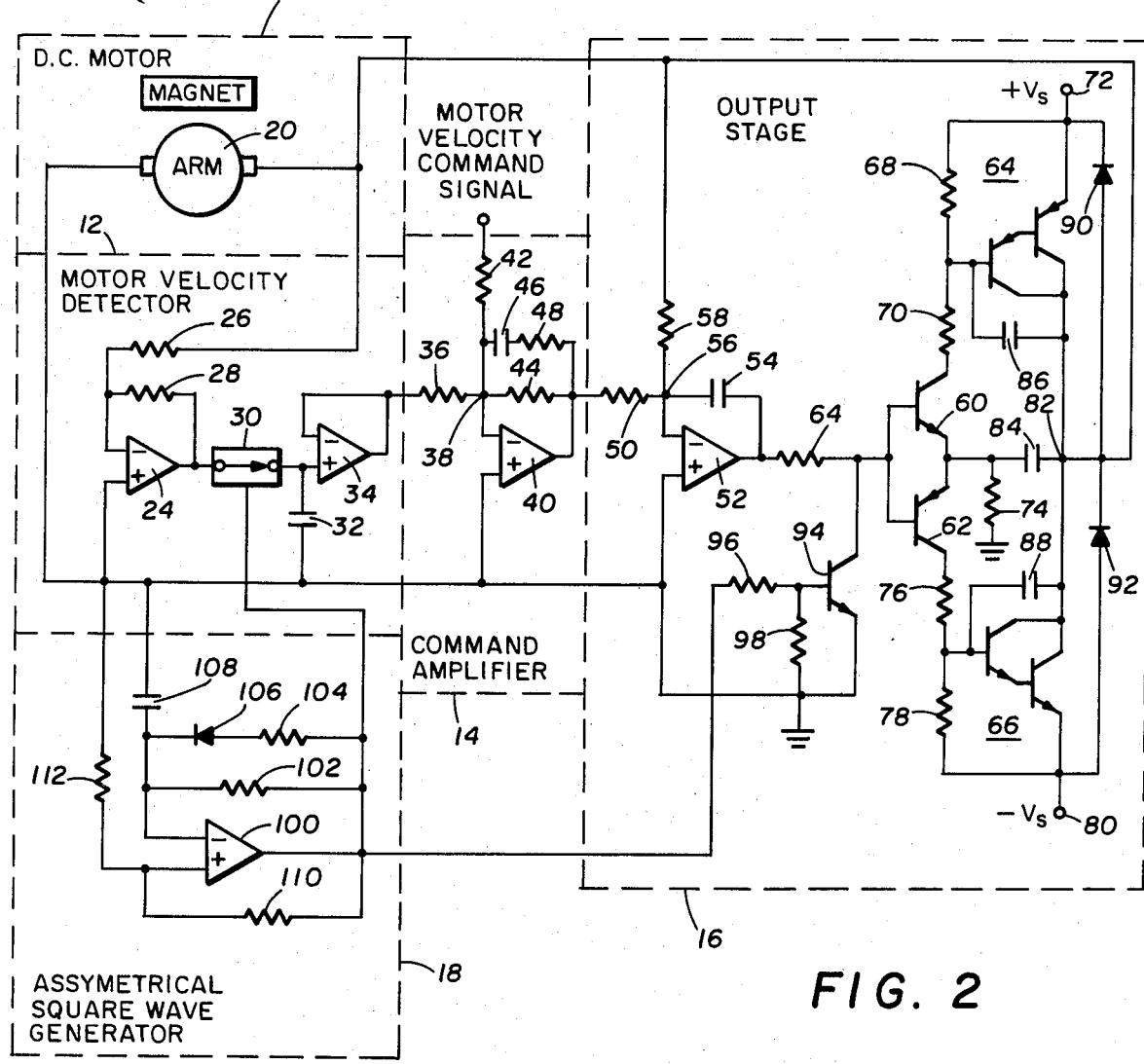
FIG. 2 is a schematic diagram of the motor velocity sampling servo amplifier of FIG. 1.

Referring to FIG. 2, there is shown a schematic of the amplifier of FIG. 1 where the D.C. motor 10 includes an armature 20 having a conventional winding. Also included as a part of the D.C. motor 10 is a permanent magnet 22. One wire from the armature 20 is connected to an input of an inverting amplifier 24 through an input resistor 26. The gain of the amplifier 24 is established by a feedback resistor 28 connected between the output and the input at the resistor 26. The second terminal of the amplifier 24 connects to ground.

An output of the amplifier 24 is applied through a sample switch 30 to a storage capacitor 32. The storage capacitor 32 comprises the hold circuit of the motor velocity detector 12 and stores the back emf voltage from the motor during the sample time interval. This connection of the output of the amplifier 24 to the storage capacitor 32 through the switch 30 occurs only during the sample time interval. During all other times the switch 30 is opened by the removal of the sample time interval signal. During the motor drive time, when the switch 30 is open, the storage capacitor 32 stores the last measured value of the back emf of the motor 10.

This stored voltage is applied to one input upon an operational amplifier 34 having a gain determined by the feedback circuit and provides the motor velocity signal applied to one input of the command amplifier 14. This motor velocity signal is applied through an input resistor 36 to a mixing or summing junction 38 as connected to one input of a differential amplifier 40. Also connected to the summing junction 38 is the motor velocity command signal through a resistor 42. Gain of the amplifier 40 is established by a feedback resistor 44 and amplifier response time is established by a network consisting of capacitor 46 in series with resistor 48.

By means of the resistor 48-capacitor 46 circuit for the amplifier 40, the gain of this amplifier is tailored to the design characteristics of the motor 10 to achieve system stability. Also, by establishing a high gain for the amplifier 40 any low level motor velocity command signal, that is, any small signal difference at the summing junction 38 will cause a very large voltage change to be applied to the motor 10. Note, however, that as soon as the motor beings to respond to the new voltage and generates a new back emf motor velocity signal, which is stored on the capacitor 32, then the error signal at junction 38 decreases to further adjust the voltage applied to the motor 10.

A motor drive signal at the output of the amplifier 40, which is proportional to the error signal at the summing junction 38, is applied through an input resistor 50 to an input of a differential amplifier 52. A stabilizing capacitor 54 is connected across the amplifier 52 at a summing junction 56 with the resistor 50. Also connected to the summing junction 56 is a feedback resistor 58, as will be explained. A second input of the amplifier 52 is grounded.

A voltage generated at the output of the amplifier 52 is applied to base electrodes of switching transistors 60 and 62 through a base drive resistor 64. Transistors 60 and 62 are driver elements for a pair of output transistors 64 and 66, respectively. Considering first the circuitry connected to transistor 60, it drives a Darlington pair 64 through a voltage divider network including resistors 68 and 70, the former connected to a positive D.C. voltage supply at a terminal 72. The emitter electrode of the transistor 60 is interconnected to the emitter electrode of the transistor 62 and also connected to an emitter resistor 74 as part of the drive circuit for the transistors 60 and 62. Next considering the transistor 62, it drives a Darlington pair 66 through a divider network including resistors 76 and 78, the latter connected to a negative D.C. voltage supply at a terminal 80.

Both the Darlington pairs 64 and 66 are similar circuits with the collector electrodes interconnected at a junction 82 and through a stabilizing capacitor 84 to the resistor 74. A stabilizing capacitor 86 is connected across the Darlington pair 64 and a stabilizing capacitor 88 is connected across the Darlington pair 66. Connected across the Darlington pair 64 is a clamping diode 90 that protects the transistors of this pair from any inductive surge caused by disconnecting the motor 10 from an energizing source. A similar clamping diode 92 is connected across the Darlington pair 66.

To control the coupling of the power supplies at the terminals 72 and 80 to the D.C. motor 10, the output stage 16 includes an activating transistor switch 94 having a collector electrode connected to the base electrodes of the transistors 60 and 62. The emitter electrode of the transistor 94 connects to ground. The transistor 94 is driven by the motor drive time signal at the output of the generator 18 as applied through an input resistor 96. The drive voltage to the base electrode of the transistor 94 is established by the a bias resistor 98 connected between the base electrode of the transistor 94 and ground.

As previously mentioned, the resistor 58 is a feedback element feeding the output voltage at the Darlington pair 64 and the Darlington pair 66 to the summing junction 56. Basically, the Darlington pairs 64 and 66 provide power amplification for the amplifier 52 and the feedback resistor 58 completes the operational loop. The gain of the entire output stage is determined by the values of the resistors 50 and 58. It is thus possible to characterize the output stage 66 as an operational amplifier with a high output current capability and having the ability of turning off the output by means of the switching transistor 94.

To generate the motor drive time signal to the output stage 16 and the sample time interval signal to the detector 12 the asymmetrical square wave generator 18 includes a free running multivibrator comprising an amplifier 100 having a feedback configuration to the inverting input terminal that includes resistors 102 and 104, with the latter in series with a diode 106. This feedback circuit connects to a timing capacitor 108 that establishes the sample time interval and the motor drive time of the duty cycle for the D.C. motor 10. In a typical configuration of the asymmetrical square wave generator 18, the capacitor 108 establishes the duty cycle at 10% sample time and 90% motor drive time. As previously explained, this may be varied depending on the characteristics of the motor 10. Also included in the square wave generator circuit is a feedback that includes a resistor 110 to the noninverting terminal of the amplifier 100. Also connected to the noninverting terminal of the amplifier 100 is a grounded input resistor 112.

Figure 3:
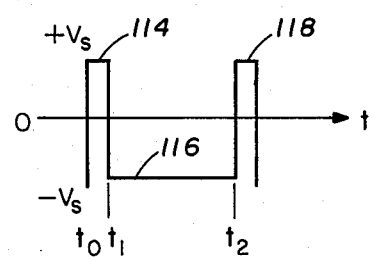
FIG. 3 is a timing chart of the duty cycle of the D.C. motor that includes a motor drive time and a sample time interval.

With reference to FIG. 3, there is shown a waveform of the output of the operational amplifier 100 to generate the sample time interval signal to the switch 30 and the motor drive time signal to the transistor switch 94. At time $t_0$ the output of the amplifier 100 steps to the level $+V_s$ as illustrated by the pulse 114. This pulse 114 is the sample time interval signal applied to close the switch 30. At the same time, the pulse 114 turns on the transistor 94 grounding the base electrodes of the transistors 60 and 62. This disconnects the voltage supply from the motor 10. During the presence of the pulse 114 the back emf of the motor 10, as generated at the output of the amplifier 24, is applied to the storage capacitor 32.

At time $t_1$ the output of the amplifier 100 steps to the $-V_s$ level as given by the pulse 116. The pulse 116 opens the switch 30 and turns off the transistor 94. The pulse 116 represents the motor drive time signal and it is . during this time interval that a voltage is applied to the motor 10. The motor 10 continues to be energized by an energizing voltage from the output stage 16 until time $t_2$. At time $t_2$ the output of the amplifier 100 again steps to the $+V_s$ level and the system recycles closing the switch 30 and turning on the transistor 94 with the results as explained previously.

To operate the motor during the presence of the motor drive time signal 116, the output of the amplifier 34 is mixed with the motor velocity command signal at the summing junction 38. The difference between these two signals is amplified through the amplifier 40 and applied to the input of the amplifier 52 which generates a drive signal to the transistors 60 and 62. Only one of the transistors 60 or 62 will be conductive for any one output of the amplifier 52. That is, the amplifier 52 has an output varying plus and minus of zero to alternately operate the transistors 60 and 62. When transistor 60 is conductive it turns on the Darlington pair 64 to connect the voltage supply at the terminal 72 to the D.C. motor 10 at a level to satisfy the motor velocity command signal. The correct voltage to be applied to the D.C. motor 10 is established by an error signal condition existing at the summing junction 38.

When the output of the amplifier 52 turns on the transistor 62 it closes the Darlington pair 66 to connect the negative voltage supply at the terminal 80 to the D.C. motor 10. This causes the motor 10 to operate in a reverse direction from that when the transistor 60 is closed and again at a level to satisfy the error signal at the summing junction 38. Operation from the D.C. motor 10 from either the positive voltage supply at the terminal 72 or the negative voltage at the terminal 80 is interrupted during the sample time interval as represented by the pulses 114 and 118 by turning on the switching transistor 94.

While only one embodiment of the invention, together with modifications thereof, has been described in detail herein and shown in the accompanying drawings, it will be evident that various further modifications are possible without departing from the scope of the invention.

What is claimed is:

1. A sampling servo amplifier for controlling the velocity of a motor having at least one motor winding, comprising in combination:

first means connected to a winding of the motor and generating a motor velocity signal varying with the motor back emf, said first means including means for storing the motor velocity signal during a motor sample time interval, and further including first switching means for connecting the motor velocity signal to said means for storing in response to a timing signal during the motor sample time interval, means for combining the motor velocity signal and a motor command signal into a motor drive voltage, an amplifier responsive to the motor drive signal for generating a voltage during the motor drive time having an amplitude varying with the amplitude of the motor drive signal, a first power amplifier connected to a first voltage for energizing the motor to rotate in a first direction, a first switch actuated by the motor drive signal of said amplifier of a first sense during the motor drive time to turn on said first power amplifier to connect the first voltage to the motor, a second power amplifier connected to a second voltage for energizing the motor to rotate in a second direction, a second switch actuated by the motor drive signal of said amplifier of a second sense during the motor drive time to turn on said second power amplifier to connect the second voltage to the motor, second switching means for interrupting the application of the output voltage of said amplifier to said first and second switches during the motor sample time interval and for connecting the output of said amplifier to said switches in response to the timing signal during the motor drive time, and means for generating the timing signal to said first means for switching and to said second means for switching.

2. A motor velocity sampling servo amplifier as set forth in claim 1 wherein said first and second power amplifiers are Darlington pairs.

3. A motor velocity sampling servo amplifier as set forth in claim 1 wherein said first means for switching disconnects said means for storing from the motor during the motor drive time.

4. A sampling servo amplifier for controlling the velocity of a motor as set forth in claim 1 including a time generator for providing the sample time interval signal to said first means for switching and the motor drive time signal to said second means for switching.

5. A motor velocity sampling servo amplifier as set forth in claim 1 wherein said means for generating the timing signal includes an asymmetrical oscillator.

* * * * *